(12) United States Patent
Pan (10) Patent No.: US 10,220,432 B2
(45) Date of Patent: Mar. 5, 2019

(54) WELDED IDLER AND MANUFACTURING METHOD THEREOF

(71) Applicant: DONGXING AUTO PARTS CO., Linhai, Zhejiang (CN)

(72) Inventor: Zhaoxing Pan, Linhai (CN)

(*) Notice: Subject to any disclaimer, the term of this patent is extended or adjusted under 35 U.S.C. 154(b) by 133 days.

(21) Appl. No.: 15/598,300

(22) Filed: May 17, 2017

(65) Prior Publication Data

US 2018/0141104 A1    May 24, 2018

(30) Foreign Application Priority Data

Nov. 23, 2016 (CN) .......................... 2016 1 1037759

(51) Int. Cl.
*B21D 53/26* (2006.01)
*B23K 20/12* (2006.01)
*B21D 22/14* (2006.01)
*F16C 19/06* (2006.01)
*F16H 55/36* (2006.01)

(52) U.S. Cl.
CPC ........... *B21D 53/261* (2013.01); *B21D 22/14* (2013.01); *B23K 20/129* (2013.01); *F16C 19/06* (2013.01); *F16C 2226/12* (2013.01); *F16C 2361/63* (2013.01); *F16H 55/36* (2013.01)

(58) Field of Classification Search
CPC .... B21D 53/261; B21D 22/14; B23K 20/129; F16H 55/36; F16C 2361/63; F16C 2226/12; F16C 19/06
See application file for complete search history.

Primary Examiner — Moshe Wilensky (57) ABSTRACT

The present disclosure relates to the field of idler, and in particular, to a welded idler and manufacturing method thereof. The method comprises steps of (1) separately manufacturing at least two parts; (2) friction welding, (3) spin forming, (4) turning an inner circle and an outer end surface, (5) turning another end surface, (6) surface treatment, (7) installing a bearing, (8) installing a bearing cover, (9) painting.

4 Claims, 8 Drawing Sheets

WELDED IDLER AND MANUFACTURING METHOD THEREOF

TECHNICAL FIELD

The present disclosure relates to the field of an idler production, and in particular, to a welded idler and manufacturing method thereof.

BACKGROUND

An idler is primarily consisted of a fixed housing, tension arms, a roller, torsion springs, rolling bearings and a flexible shaft sleeve and other components. The idler can automatically adjust the tensile force according to different tightness degrees of a belt, to ensure that a transmission system is stable and reliable. The idler is a rapid wearable part as auto accessories, and the belt is easy stretched after working for an extended period. Some of the idler can automatically adjust the tensile force of the belt, and with the idler, the belt can run more smoothly, its noise is reduced, and slipping may be prevented. As the role of the idler is used to adjust the tightness of a timing belt, it is usually replaced with the timing belt. While other parts only need regular maintenance if not replaced, the oil must be frequently changed, e.g. in general, the oil should be renewed while the driving distance is more than four thousand to five thousand kilometers. An conventional idler of this type commonly employs two half-round rollers riveted together. However, using such manufacturing method, will lead to the following shortcomings and deficiencies: an excessive number of rivets and low productivity; and the idler is deformed after riveting, the accuracy of a product becomes low, and a flat groove surface of the two half-round rollers is not smooth, resulting in the belt prone to be worn and the life of the belt to be reduced. Moreover, the surface that two half-round rollers contacting with bearing parts is small, so bearings are easy to be loosen or jammed after assembled, and the life of the bearings is short. In addition, using a method of stamping and then welding, the idler would have the residual stress and a deformation. By searching, the inventor has found no relevant patents but only one referenced application numbered with CN201610377854.0 to the present invention. The CN201610377854.0 is disclosed with a forming process of idler only by extrusion, the method will damage the toughness of metal material more or less, and cannot ensure the strength of the idler.

SUMMARY

The object of this present invention, directed to the aforementioned issues, is to provide a welded idler and a manufacturing method thereof.

The invention is accomplished by:

The manufacturing method of a welded idler, comprises following steps:

(1) separately manufacturing at least two parts: punching and stretching a provided cylindrical hot-rolled steel plate, then extruding it with a first mold to obtain a flange-like blank, which is cylindrically shaped and has an annular boss on the inner wall thereof; a disc shaped hot-rolled steel plate is provided to be stretched and then punched to form a disc-shaped blank with a first groove;

(2) friction welding: installing welding jigs on a horizontal friction welding machine, wherein the welding jigs clamp the flange-like blank and the disc-shaped blank in rotary friction with a high-pressure, so that a bottom of the flange-like blank and a connecting edge of the first groove of a disc surface of the disc-shaped blank are fused together, to form a prefabricated flange blank, wherein a bearing hole is formed while the welding jigs clamp the flange-like blank and the disc-shaped blank;

(3) spin forming: mounting a spin forming wheel on a spin forming machine, wherein said wheel is in contact with a circumferential surface of the prefabricated flange blank, and a spindle of the spin forming machine is rotated to drive a core mold and a semi-finished product to rotate, and the spin forming wheel is sequentially rotated and moved at a horizontal direction, the spin forming wheel spins and divides the circumference surface into two halves to form a second groove extending perpendicularly to the circumference surface, to obtain a semi-finished spin product;

(4) turning an inner circle and an outer end surface: clamping an outer cylindrical surface of the bearing hole of the semi-finished spin product by a CNC lathe, processing the inner circle surface and a top end surface of the bearing hole, forming a bearing seat with a cover formed on one side and a flat ring with steps formed on the other side;

(5) turning a second end surface: clamping the inner circle surface of the bearing hole on the CNC lathe, then processing a bottom end surface of the bearing hole;

(6) surface treatment: processing the semi-finished spin product's surface through a surface treatment line with a spraying treatment, except the bearing hole and a surface of a stepped flat ring thereof;

(7) installing a bearing: installing a second mold on a hydraulic press machine, and pressing the bearing into the bearing seat by way of interference fitting;

(8) installing a bearing cover: mounting a clamp to a shoveling machine, pushing a edge of the bottom of the bearing hole to form an outer ring of the bearing along the flat ring with the steps, to form the bearing cover;

(9) painting: painting the bearing cover.

In summary, the manufacturing method of the welded idler provided by the present disclosure comprises the steps of two parts that are manufactured separately, friction welded, spin formed, so that it overcomes problems such as large material waste and low production efficiency in the prior art, the method has the advantages of high material utilization ratio, high production efficiency, and low production cost. The use of two parts that are manufactured separately can effectively reduce the metal stress, strengthen the metal toughness, demand less molding machinery, and provide better protection to workpieces. The present disclosure also shows attaching two parts together by friction welding, where the strength of the friction welding is greater than the strength of the material itself, that is, when pulled by an external force, the first fracture will occur at a part that is not welded, instead of a welded part. The way of protection with spraying on the metal surface can extend the life of idler.

Wherein, 111 is a first part, 112 is a second part, 211 is a first component area after a friction welding, 212 is a second component area after the friction welding, 22 is a spin forming area, 321 is a surface of a spin forming wheel, 322 is a belt area of the spin forming wheel, 41 is the bearing hole, 42 is a retaining ring, 51 is the bearing cover, 71 is the bearing, 72 is a bearing seat, 81 is a second cover of the bearing, 91 is a painting area.

DETAILED DESCRIPTION

The invention will now be described in further detail with reference to the accompanying drawings.

Figure 1:
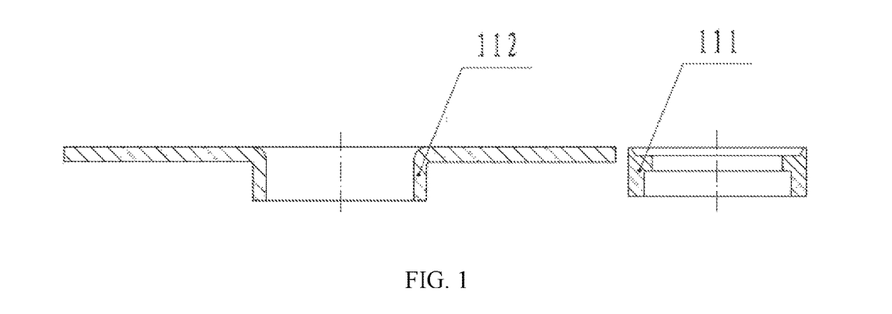
FIG. 1 is a schematic diagram showing a process of formation of a manufacturing method of a welded idler according to one embodiment of the disclosure.

A manufacturing method of a welded idler comprises following steps:

①Two parts are manufactured separately while both are made of hot-rolled steel. Regarding to manufacturing of a first part, a first steel plate is provided to be punched and then stretched to form a first blank, which is in the form of a flange and a disc-shape with a boss. A first mold is installed on a hydraulic press machine. After extrusion, the first blank is obtained. Regarding to a second part, a second steel plate is stretched and then punched to form a U-shaped blank. Specifically, this step comprises a punch preformed to a center of said steel plate, as shown in FIG. 1, label 111 is the first part, label 112 is the second part, the first part 111 is the steel plate blank with boss and has a disc shape. An arc of a connection between the boss and said blank's disc portion is as small as possible.

Figure 2:
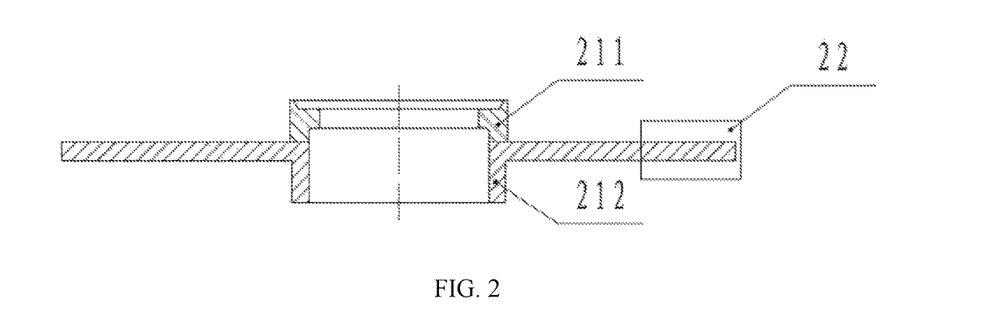
FIG. 2 is a schematic diagram showing a process of friction welding of the manufacturing method of a welded idler according to one embodiment of the disclosure.

②A process of friction welding: welding jigs are mounted on a horizontal friction welding machine. The first part and the second part are rotated under a high-pressure state, and their materials are fused together to form a prefabricated flange blank with a U-shape portion at its center As shown in FIG. 2, the first part and the second part are fused together by the horizontal friction welding machine, ensuring the fused portion is not fractured under a pressure of 60 KN. The height of a first component area 211 of the first part is slightly shortened as compared with the height of the first part 111 before said process, while a pulley body area 212 is not changed.

③A process of spin forming: a spin forming wheel is mounted on a spin forming machine and is contacting with parts of a circumference surface of a semi-finished product as described hererabove, a spindle of the spin forming machine rotates to drive a core mold and the semi-finished product to rotate, and the spin forming wheel is sequentially rotated and moved at a horizontal direction as a feeding movement, to form a final molding section, and to produce a semi-finished spin product. The spin forming machine is mounted with the core mold, and the semi-finished spin product is installed onto the core mold, and three spin forming wheels are respectively mounted to three spin forming positions of the spin forming machine. Through the rotation of the spindle of the spin forming machine, the core mold and the semi-finished spin product are driven to rotate. The spin forming wheels rotate the semi-finished product at a certain speed and squeeze it with their horizontal movement, to form a shape shown in FIG. 3.

Figure 3:
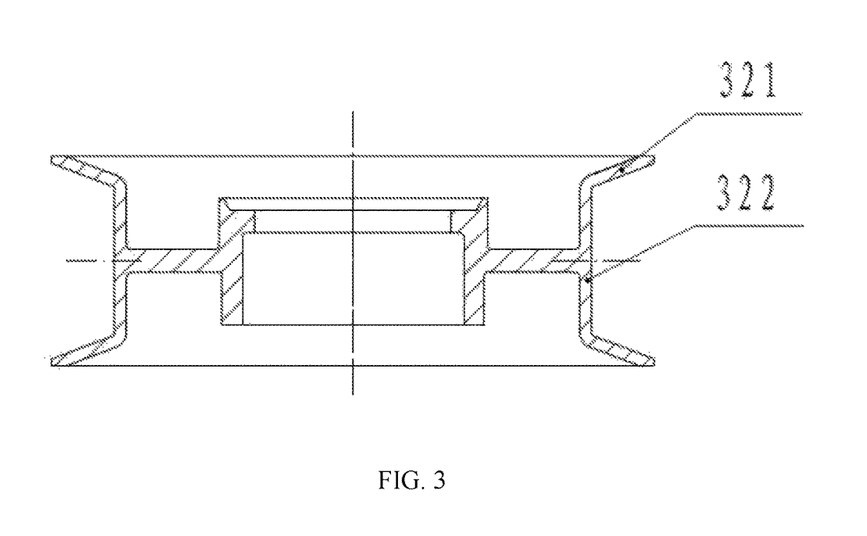
FIG. 3 is a schematic diagram showing a process of spin forming of the manufacturing method of a welded idler according to one embodiment of the disclosure.

The rotation speed of the spin forming wheels and the speed of the feed movement has a relationship of: $30000V-W^2=50000$, wherein W is the rotation speed of the spin forming wheels, 500 r/s≥W≥200 r/s, V is the speed of the feed movement of the spin forming wheels, which is 80 mm/s. At this speed, any formed product shall not be damaged during manufacturing and the toughness of its metallic material is not affected and its brittleness does not increase. If the speed of the feed movement is too high, there is a risk of damaging and leading deformation to the blank, and if said speed is too slow, a manufacturing cost may be affected by significantly increased power consumption.

Figure 4:
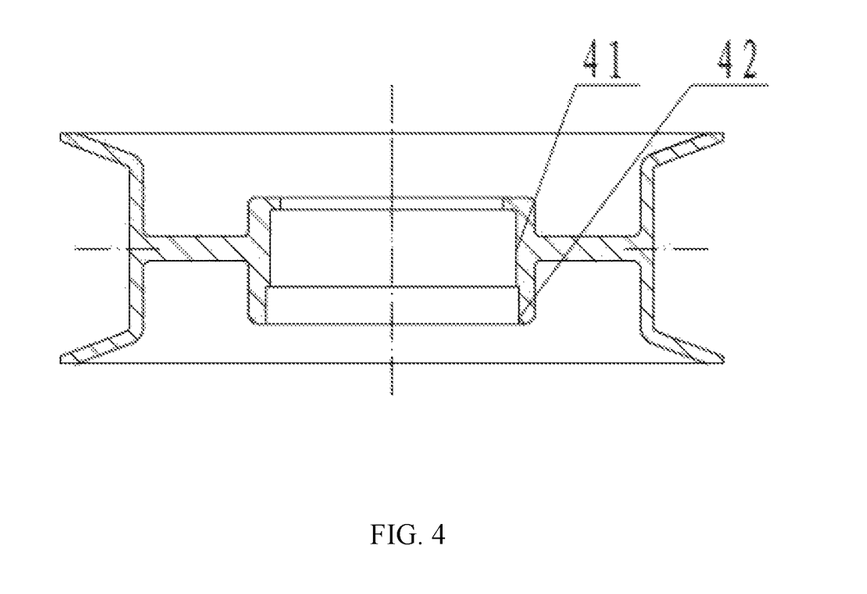
FIG. 4 is a schematic diagram showing a process of turning a bearing hole of the manufacturing method of a welded idler according to one embodiment of the disclosure.

④A process of turning an inner circle and a small end surface: a CNC (Computer numerical control) lathe clamps a large inner circle to process said inner circle's surface and the small end surface, to form a bearing seat with a cover formed on one its first side and a flat ring with steps formed on its second side; as shown in FIG. 4, in the processing of turning the inner circle's surface and part of a outer circle surface, there is a requirement of a high degree of accuracy of a bearing hole 41, and the maximum surface roughness is 1.6. In addition, the outside diameter of a retaining ring 42 is larger than the inner diameter of the bearing hole 41.

Figure 5:
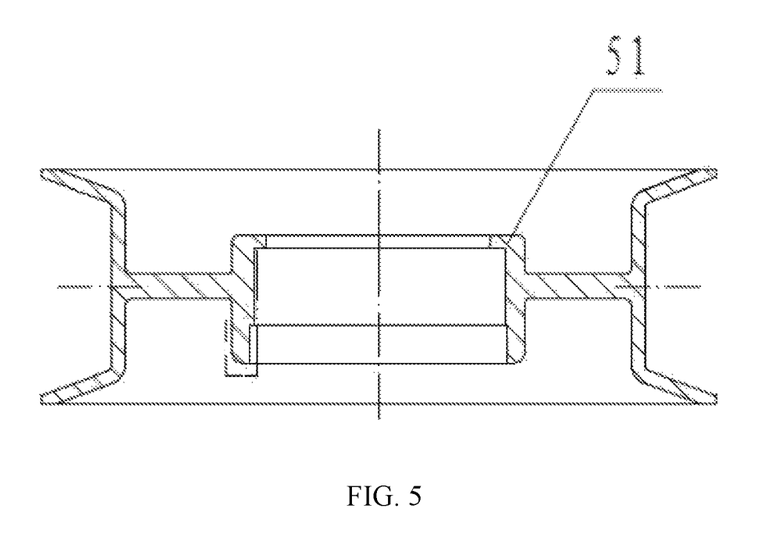
FIG. 5 is a schematic diagram showing a process turning another end surface of the manufacturing method of a welded idler according to one embodiment of the disclosure.

⑤A process of turning a second end surface: the CNC lathe clamps the larger inner circle in an opposite direction, and then processes the small end surface; as shown in FIG. 5, the CNC lathe processes said end surface and a center hole 51.

⑥A process of surface treatment: performing surface treatment expect to the bearing hole and a surface of the flat ring, which is shown as a broken line area in FIG. 5.

Figure 6:
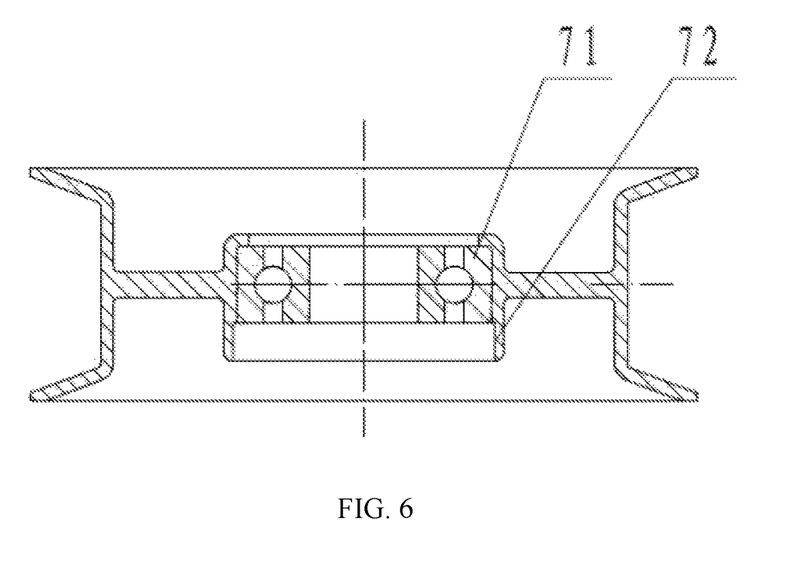
FIG. 6 is a schematic diagram showing a process of installing a bearing of the manufacturing method of a welded idler according to one embodiment of the disclosure.

⑦A process of installing a bearing: installing a second mold on a small hydraulic press machine, and pressing the bearing into the bearing seat by way of interference fitting. As shown in FIG. 6, the bearing 71 and the bearing seat 72 are interferencially fitted together.

Figure 7:
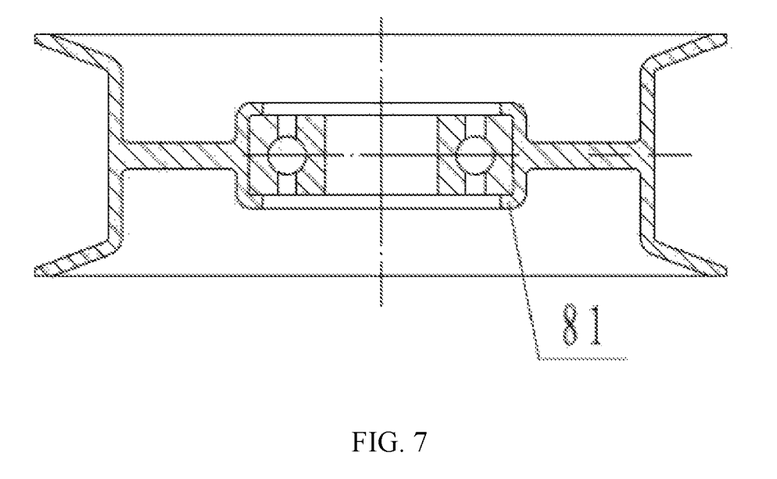
FIG. 7 is a schematic diagram showing a process of installing a bearing cover of the manufacturing method of a welded idler according to one embodiment of the disclosure.

⑧A process of installing the bearing cover: a clamp is mounted on a shoveling machine and the flat ring under this step is pushed down and pressed onto an outer end surface of the bearing; as shown in FIG. 7, a pair of cutters on the shoveling machine are employed to squeeze the flat ring of the bearing seat 72, downwardly and radially, until it fitting in an end surface of the bearing.

Figure 8:
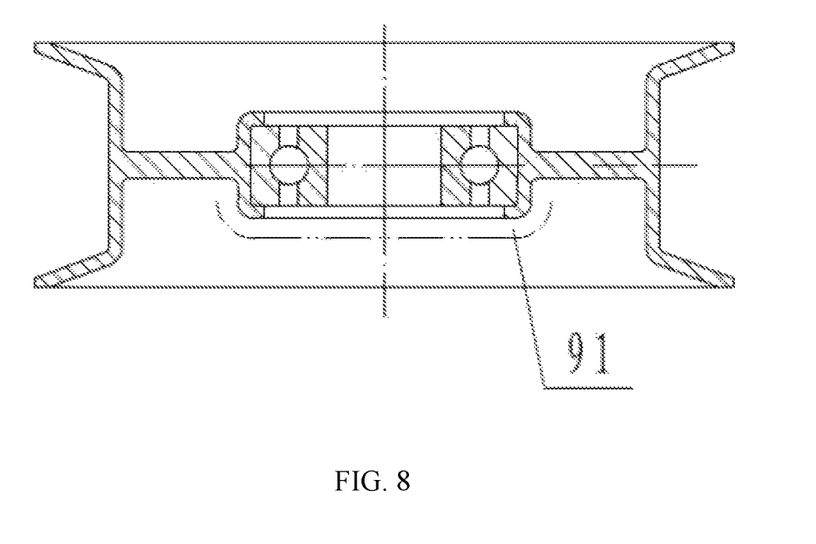
FIG. 8 is a schematic diagram showing a process of painting of the manufacturing method of a welded idler according to one embodiment of the disclosure.

⑨A process of painting: an outer cover of the bearing is painted on a painting fixture. As shown in FIG. 8, the bearing outer cover 91 with one end exposed is sprayed and painted.

Shown in FIG. 3, in the steps of spin forming, a upper and a lower roller surface 321 of the semi-finished spin product is symmetrical with respect to a central axis. An angle is formed between the upper and the lower roller surface 321 and a belt area 322.

The friction welding machine adopts a new welding technology, i.e. the friction welding. The friction welding is a pressure welding method, using the heat generated by the friction of contact surfaces in relative movements, so that end surfaces reach a thermoplastic state and then quickly forged to complete the welding. With this welding method, the strength of a workpiece is great after welding, and a welded area will not be broken and defects.

A first preformed work surface of the first part in the spin forming step is a cylindrical surface with a pointed cone.

A second performed work surface of the second part is a cylindrical surface which is slightly shallower than the shaping spin forming wheels.

A working surface of the spin forming wheels has the second groove with a certain angle, a center position of said groove is perpendicular to a central axis of the spin forming wheels.

The bearing seat requires high processing precision grade, and the maximum surface roughness is 1.6;

The bearing cover is capable of standing a minimum force of 30 KN.

The first preformed work surface is a surface of the first part in contact with an outer circumference of the semi-finished product during the spinning process. The second preformed work surface is the surface that the second part first contact with the semi-finished product. The working surface of the spin forming wheels is the surface that the spin forming wheels and the preformed portion of the semi-finished product are later contacted. The outer edge of the blank is spun to form a first preformed portion with a large circular arc shape, then a second preformed portion is formed after the first preformed portion is spun, then a final formation is achieved.

Preferably, the center of the blank is trimmed with the first mold so that the arc of the preformed blank is made as small as possible.

Preferably, in the step of spin forming, the contour of the spin forming wheels is similar to that of a tensioning wheel.

Preferably, the bearing seat is coaxial and centrally symmetric with respect to a flat belt area of a idler.

In the welding process of the disclosure, firstly, the shape of the blank is pretreated and friction welded, and the outer edge of the blank is first spun, and then the bearing seat is installed. With spin forming step, the surface of the product is dense, wear resistance is better, making its life longer. This method produces the product structure is light, the surface quality, finished parts of the mechanical properties have been significantly improved. The requirements to the appearance of the product can be met, and suitable for high-volume production use.

What is claimed is:
1. A manufacturing method of a welded idler, comprising following steps of:
    (1) separately manufacturing two parts, wherein a first cylindrical hot-rolled steel plate was punched, stretched, with a first mold to obtain a flange-like blank, which is cylindrically shaped and has an annular boss on its inner wall; a second hot-rolled steel plate is stretched and punched to form a disc-shaped blank with a first groove;
    (2) friction welding a bottom of the flange-like blank and a connecting edge of the grooves of a disc surface of the disc-shaped blank together, to form a prefabricated flange blank, wherein a bearing hole is formed;
    (3) spinning the prefabricated flange blank to form a semi-finished spin product, wherein its circumference surface is divided into two halves to form a second groove extending perpendicularly;
    (4) processing an inner circle surface and a top end surface of the bearing hole, to form a bearing seat with a cover formed on a first side of the bearing seat and a flat ring formed on the other side thereof;
    (5) processing a bottom end surface of the bearing hole;
    (6) performing surface treatment expect to the bearing hole and a surface of the flat ring;
    (7) pressing a bearing into the bearing seat by way of interference fitting;
    (8) pushing a edge of a bottom of the bearing hole to form a bearing cover;
    (9) painting the bearing cover.

2. The manufacturing method according to claim 1, wherein, a center axis of the groove is perpendicular to a central axis of forming wheels.

3. The manufacturing method of according to claim 1, wherein, a maximum surface roughness of the bearing seat is 1.6.

4. The manufacturing method of according to claim 1, wherein, a rotation speed of a spin forming wheel and the speed of a feed movement has a relationship of: $30000V-W^2=50000$, wherein W is a rotation speed of the spin forming wheel, 500 r/s≥W≥200 r/s, V is a speed of the feed movement of the spin forming wheel, and V is 80 mm/s.

* * * * *